(12) United States Patent
Mutsuno

(10) Patent No.: US 11,305,573 B2
(45) Date of Patent: Apr. 19, 2022

(54) IMAGE FORMING APPARATUS, CONTROLLING METHOD OF IMAGE FORMING APPARATUS, INFORMATION PROCESSING APPARATUS, CONTROLLING METHOD OF INFORMATION PROCESSING APPARATUS, AND STORAGE MEDIUM

(71) Applicant: CANON KABUSHIKI KAISHA, Tokyo (JP)

(72) Inventor: Masahiro Mutsuno, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/165,288

(22) Filed: Feb. 2, 2021

(65) Prior Publication Data
US 2021/0252896 A1 Aug. 19, 2021

(30) Foreign Application Priority Data
Feb. 14, 2020 (JP) .............................. JP2020-023140

(51) Int. Cl.
| B65H 35/00 | (2006.01) |
| B42C 19/02 | (2006.01) |
| H04N 1/00 | (2006.01) |
| B65H 37/06 | (2006.01) |
| B65H 37/04 | (2006.01) |
| B42C 19/08 | (2006.01) |

(52) U.S. Cl.
CPC ......... *B42C 19/02* (2013.01); *B65H 35/0086* (2013.01); *B65H 37/04* (2013.01); *B65H 37/06* (2013.01); *H04N 1/0066* (2013.01); *H04N 1/00639* (2013.01); *B42C 19/08* (2013.01); *H04N 2201/0094* (2013.01)

(58) Field of Classification Search
CPC .... B54H 35/0086; B54H 37/04; B54H 37/06; B42C 19/02; B42C 19/08; H04N 1/0066; H04N 1/00639
USPC ....................................... 270/58.07
See application file for complete search history.

(56) References Cited

U.S. PATENT DOCUMENTS

| 8,011,650 | B2 * | 9/2011 | Tao ..................... G03G 15/6582 |
| | | | 270/58.09 |
| 8,311,473 | B2 * | 11/2012 | Sasaki ....................... B26F 1/02 |
| | | | 399/408 |
| 9,549,092 | B2 * | 1/2017 | Kitahara ............. H04N 1/00925 |
| 10,606,524 | B2 * | 3/2020 | Iida ......................... G06F 3/1205 |

FOREIGN PATENT DOCUMENTS

JP    2005257959 A    9/2005

* cited by examiner

*Primary Examiner* — Leslie A Nicholson, III
(74) *Attorney, Agent, or Firm* — Rossi, Kimms & McDowell LLP

(57) ABSTRACT

In case of simultaneously performing a punching process and a finishing process other than the punching process in an image forming apparatus, in order to prevent an unnecessary (ineffectual) finishing process from being performed, an information processing controller unit of a multifunction peripheral performs control of permitting to set in combination a double-punching center setting and a bookbinding setting, and of prohibiting to set in combination a punch setting, other than the double-punching center setting, and the bookbinding setting.

11 Claims, 12 Drawing Sheets

| | | PROHIBITION OF SINGLE PUNCHING | PROHIBITION OF DOUBLE-PUNCHING CENTER | PROHIBITION OF DOUBLE-PUNCHING RIGHT AND LEFT |
|---|---|---|---|---|
| | | SINGLE PUNCHING | DOUBLE-PUNCHING CENTER | DOUBLE-PUNCHING RIGHT AND LEFT |
| PROHIBITION OF BOOKBINDING | BOOKBINDING | X | O | X |

|  |  | PROHIBITION OF SINGLE PUNCHING | PROHIBITION OF DOUBLE-PUNCHING CENTER | PROHIBITION OF DOUBLE-PUNCHING RIGHT AND LEFT |
|---|---|---|---|---|
|  |  | SINGLE PUNCHING | DOUBLE-PUNCHING CENTER | DOUBLE-PUNCHING RIGHT AND LEFT |
| PROHIBITION OF BOOKBINDING | BOOKBINDING | × | ○ | × |

IMAGE FORMING APPARATUS, CONTROLLING METHOD OF IMAGE FORMING APPARATUS, INFORMATION PROCESSING APPARATUS, CONTROLLING METHOD OF INFORMATION PROCESSING APPARATUS, AND STORAGE MEDIUM

BACKGROUND OF THE INVENTION

Field of the Invention

The present invention relates to control of an image forming apparatus capable of performing a post-process of printing sheets, for example, an image forming apparatus capable of performing a punching process and a saddle-stitch bookbinding process in production printing.

Description of the Related Art

In recent years, digital multifunction peripherals to be used in production printing are increasingly being used to produce a small number of print products. For this reason, in many cases, a finishing apparatus is directly connected to an image forming apparatus in the digital multifunction peripheral.

As the finishing apparatuses, there are a saddle-stitch bookbinding device for performing saddle-stitch bookbinding, a multifunctional puncher for making a punch hole (or punching) so as to bind a product to a binder, and the like. Here, the saddle-stitch bookbinding is one of finishing for booklets to be created by the digital multifunction peripheral. Namely, the saddle-stitch bookbinding is a method of stacking printed paper in a booklet-opened state, folding the stacked paper in half, and stapling the folded part at the center of the paper. In addition, as the finishing, there is a finishing method (double punching) of punching to make two punch holes at positions symmetrical to a saddle stitching position such that a product of saddle-stitch bookbinding can be stored in a binder.

Japanese Patent Application Laid-Open No. 2005-257959 provides a technique of, when a punching function is selected in a case where a double copying function for copying two images on one sheet or a rotary double copying function is selected, selecting a side punch setting of automatically performing a punching process to predetermined positions at both ends in a longitudinal direction of a sheet.

The multifunctional puncher can perform not only the double punching of punching to make the two punch holes on the sheet, but also single punching of punching to make only one punch hole on a sheet. However, in finishing of a booklet created by the digital multifunction peripheral, even if a punch hole is made by the single punching, a product such as the booklet thus obtained cannot be stored in a binder, so that such a punching process is meaningless and unnecessary. As just described, when the punching process and the finishing process other than the punching process are simultaneously performed by the image forming apparatus, there is a problem that an unnecessary (ineffectual) finishing process may be performed. This problem has not been solved by the conventional technique such as shown in Japanese Patent Application Laid-Open No. 2005-257959.

The present invention has been completed to solve the above problem. An object of the present invention is to provide a mechanism for preventing an unnecessary finishing process from being performed in a case where the punching process and the finishing process other than the punching process are performed in combination by the image forming apparatus.

SUMMARY OF THE INVENTION

The present invention is directed to an image forming apparatus that is equipped with a punching function of performing a punching process to punch a sheet and a bookbinding function of performing a bookbinding process to sheets, and is characterized by comprising: a control unit configured to perform control of permitting to set in combination a first punch setting of performing the punching process symmetrically with respect to a center line of the sheet and a bookbinding setting of performing the bookbinding process, and of prohibiting to set in combination a punch setting, different from the first punch setting, and the bookbinding setting.

According to the present invention, when the punching process and a finishing process other than the punching process are performed in combination in the image forming apparatus, it is possible to prevent an unnecessary finishing process from being performed. Therefore, it is possible in the image forming apparatus to effectually perform both the punching process and the finishing process other than the punching process.

Further features of the present invention will become apparent from the following description of exemplary embodiments with reference to the attached drawings.

BRIEF DESCRIPTION OF THE DRAWINGS

FIGS. 7A, 7B, 7C, 7D-1, 7D-2 and 7D-3 are diagrams for explaining "prohibition of double-punching center" according to the first embodiment.

FIG. 12 is a diagram for explaining the prohibition of the bookbinding process and the punching process according to the first embodiment.

DESCRIPTION OF THE EMBODIMENTS

Hereinafter, preferred embodiments of the present invention will be described in detail with reference to the attached drawings.

First Embodiment

In the first embodiment, a mechanism of preventing, in a case where, as finishing processes of an image forming apparatus, a punching process and a finishing process (i.e., a bookbinding process in the present embodiment) other than the punching process are simultaneously performed, an unnecessary (useless) finishing process from being performed will be described using a multifunction peripheral as an example.

Figure 1:
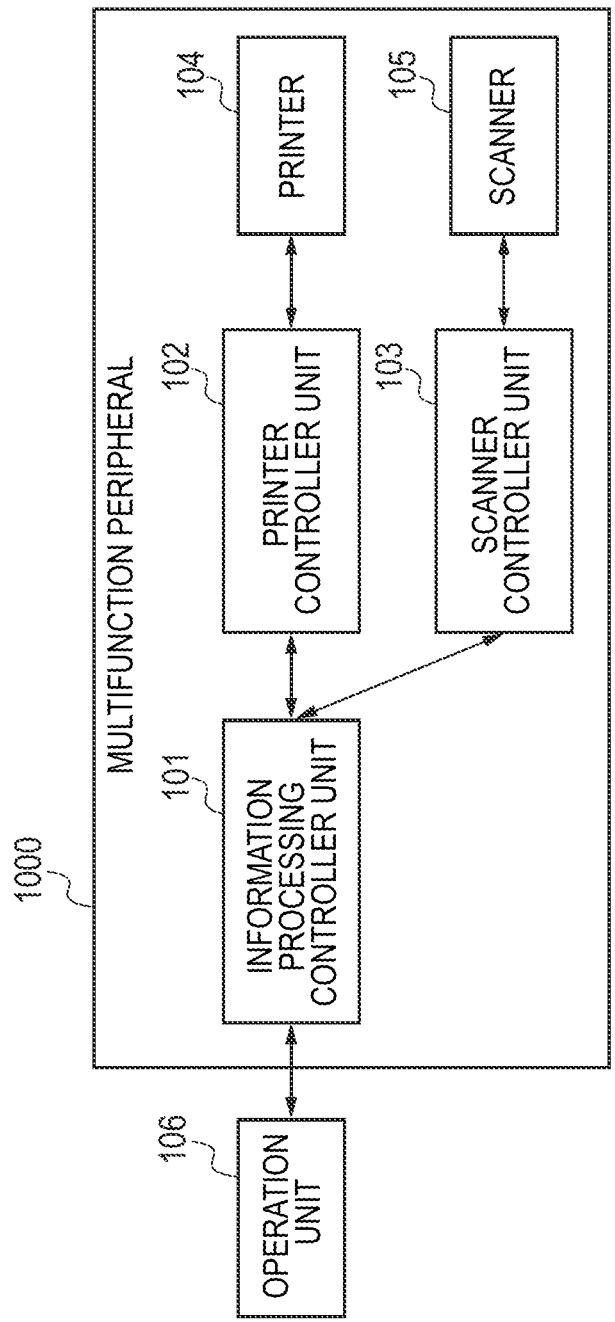
FIG. 1 is a diagram for describing an example of a constitution of a multifunction peripheral to which an image forming apparatus according to embodiments of the present invention can be applied.

FIG. 1 is a diagram for describing an example of a constitution of a multifunction peripheral to which an image forming apparatus according to the embodiment of the present invention can be applied.

A digital multifunction peripheral (hereinafter also referred to as "multifunction peripheral") 1000 is an image forming apparatus that has an information processing controller unit 101, a printer controller unit 102, a scanner controller unit 103, a printer 104, a scanner 105 and an operation unit 106.

The information processing controller unit 101 is a controller that integrates information processing control related to operations of the multifunction peripheral 1000, and the operation unit 106 is connected to the information processing controller unit 101. Further, the printer controller unit 102 and the scanner controller unit 103 are connected to the information processing controller unit 101.

The printer controller unit 102 controls the printer 104 that is an image output device. The scanner controller unit 103 controls the scanner 105 that is an image input device.

Figure 2:
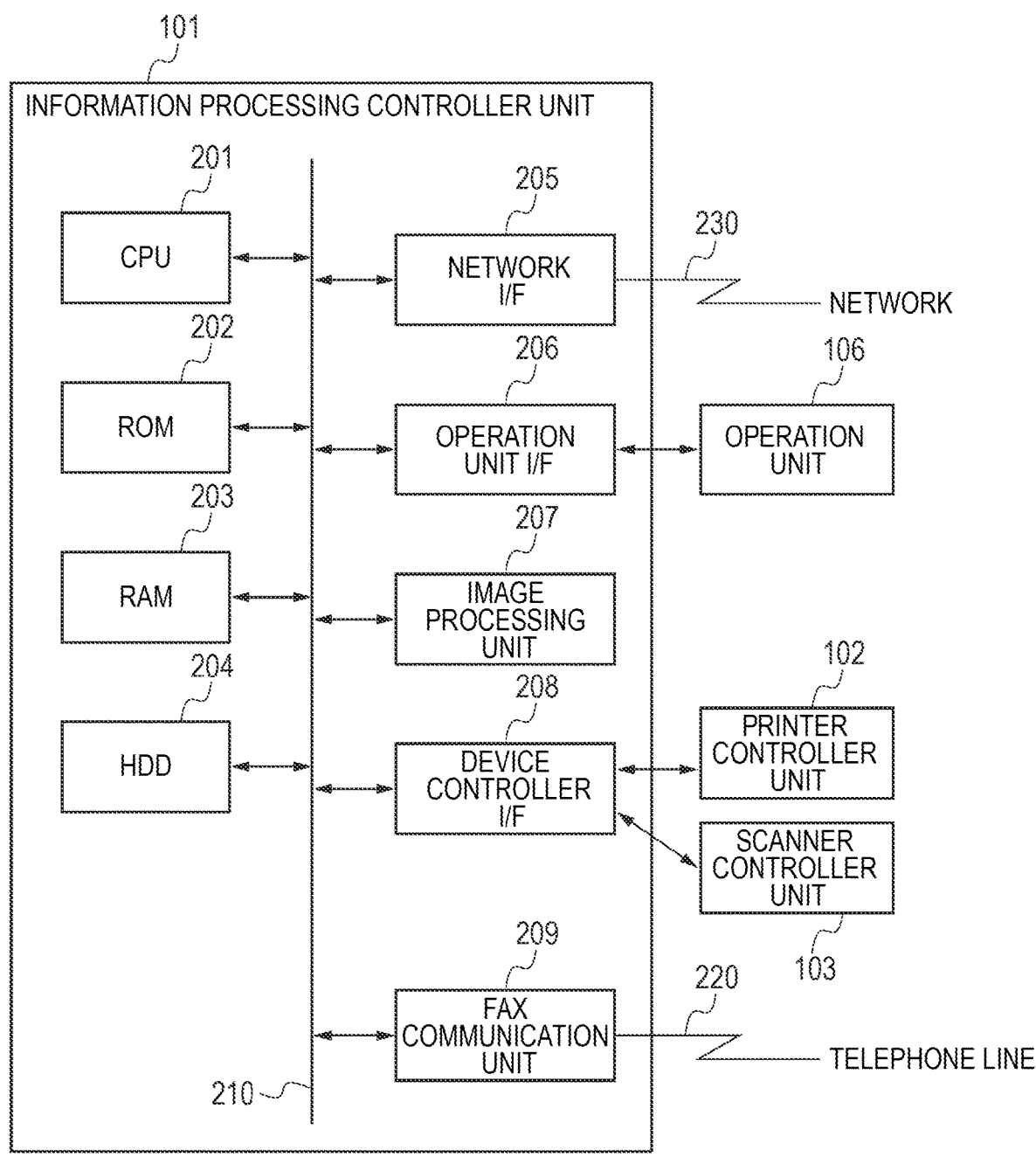
FIG. 2 is a block diagram for describing an example of a constitution of an information processing controller unit.

FIG. 2 is a block diagram for describing an example of a constitution of the information processing controller unit 101.

The information processing controller unit 101 has a CPU (central processing unit) 201. The CPU 201 boots an OS (operating system) by a boot program stored in a ROM (read only memory) 202. The CPU 201 executes, on this OS, application programs stored in an HDD (hard disk drive) 204, realizes a scanning function, a printing function a fax function, and further realizes various functionalities using a network and a memory storage. Besides, the OS and the application programs have functions of detecting occurrence of errors by monitoring the statuses of various units constituting the apparatuses.

A RAM (random access memory) 203 is used as a work area for the CPU 201. The RAM 203 provides the work area, and also provides an image memory area for temporarily storing image data.

The HDD 204 is a hard disk that stores therein the above application programs, the image data, various setting values and histories. Incidentally, a constitution in which another storage device such as an SSD (Solid State Drive) or the like is used instead of or in combination with the hard disk may be adopted.

An operation unit I/F (interface) 206, a device controller I/F 208, a network I/F 205, an image processing unit 207 and a fax communication unit 209 are connected to the CPU 201 together with the ROM 202, the RAM 203 and the HDD 204, via a system bus 210.

The operation unit I/F 206 is an interface with the operation unit 106 that has an LCD (liquid crystal display) unit by which touch-panel operations can be performed. The OS and the application programs running on the CPU 201 generate screen display image data to be displayed on the operation unit 106, and output the generated screen display image data from the operation unit I/F 206 to the operation unit 106. Besides, the OS and the application programs running on the CPU 201 obtain information input as a result of user operations from the operation unit 106 via the operation unit I/F 206.

The printer controller unit 102 and the scanner controller unit 103 are connected to the device controller I/F 208, and the device controller I/F 208 performs conversion of the image data in synchronous and asynchronous systems.

The Network I/F 205 is connected to an external network 230, and inputs/outputs information from/to various apparatus and devices (for example, an information processing apparatus such as a PC (personal computer) or the like) via the network.

The image processing unit 207 performs various image processes such as an output image process to the printer 104, an input image process from the scanner 105, an image rotation process, an image compression process, a resolution conversion process, a color space conversion process, a gradation conversion process, and the like.

The fax communication unit 209 is connected to a telephone line 220. The fax communication unit 209 is used to receive fax image data from another fax machine connected to the telephone line 220 and store the received fax image data in the HDD 204 (hereinafter referred to as "fax reception function"). The image data stored in the HDD 204 is output to the printer controller unit 102 via the device controller I/F 208, and is printed by the printer 104. Besides, the image data stored in the HDD 204 is also used for fax transmission to another fax machine via the telephone line 220.

Incidentally, in the digital multifunction peripheral that is directed to a production printing market, a system in which a finishing accessory for booklet production is equipped is often used.

Figure 3:
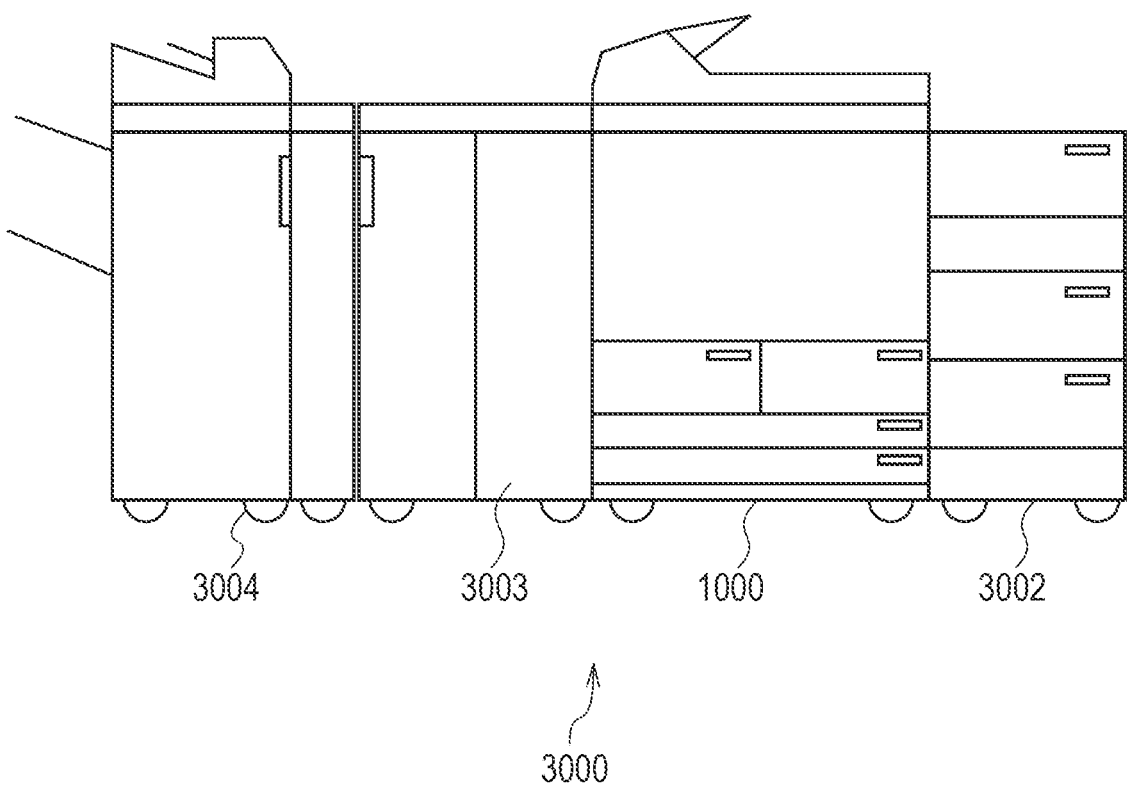
FIG. 3 is a diagram for describing an example of a system configuration for production printing.

FIG. 3 is a diagram for describing an example of a system configuration for production printing.

In the example of FIG. 3, a production printing system 3000 is equipped with one multifunctional puncher 3003 and one saddle-stitch bookbinding device 3004. That is, the production printing system 3000 is an image forming apparatus that includes total two in-line type sheet processing apparatuses as a finishing apparatus (finishing unit). In addition, the production printing system 3000 is equipped with an optional sheet deck 3002 for the purpose of sheet supply.

In this example, the saddle-stitch bookbinding device 3004 can selectively perform a stapling process, a punching process, a cutting process, a shift sheet ejection, a saddle-stitch bookbinding process, and a folding process on sheets conveyed from the multifunction peripheral 1000. The multifunctional puncher 3003 punches a sheet (that is, makes a punch hole on a sheet) conveyed from the multifunction peripheral 1000. Here, as to the multifunctional puncher 3003, a user can exchange a plurality of punch dies each of which is used for a different number of holes, and a plurality of creasers each of which makes different creases. As a result, the multifunctional puncher 3003 can perform various kinds of punching respectively corresponding to different numbers of holes and different hole shapes, and make various creases.

In the present embodiment, a method of, when producing a product to which both saddle-stitch bookbinding and punching have simultaneously been performed in the production printing system, obtaining the product that can surely be stored in the binder will be described.

Next, a constitution and an operation of the multifunctional puncher 3003 will be described with reference to FIG. 4.

Figure 4:
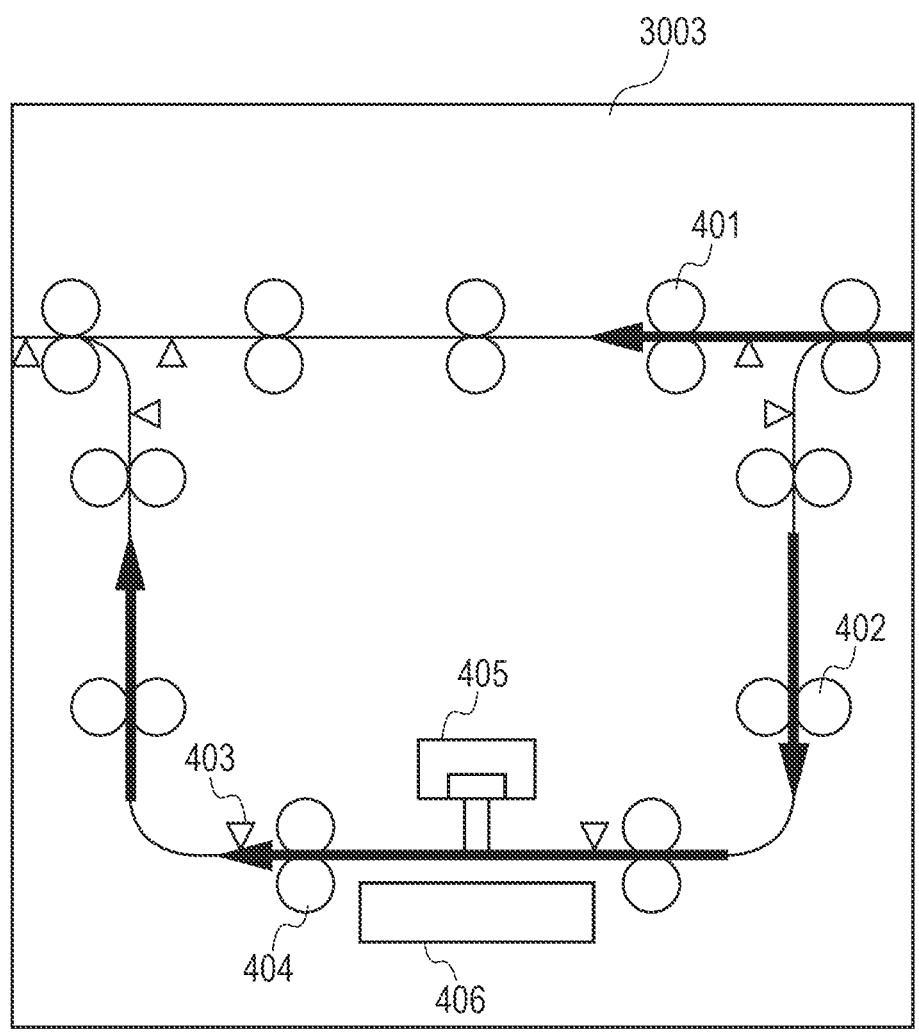
FIG. 4 is a cross-sectional diagram for describing an example of a constitution of a punching processing unit of a multifunctional puncher.

FIG. 4 is the cross-sectional diagram for describing an example of a constitution of a punching processing unit of the multifunctional puncher 3003.

As for sheet conveying paths of the multifunctional puncher 3003, there are two main types of sheet conveying paths. First, there is a bypass path at the top. Besides, there is a punch path at the bottom.

In a case where a sheet that does not require any punching process is conveyed, the sheet sent from the right side is conveyed straight to the left by bypass rollers 401 and then sent to the saddle-stitch bookbinding device 3004 being a next finishing unit.

On the other hand, in a case where a sheet that requires a punching process is conveyed, the sheet is conveyed to the punch path by punch path rollers 402. Skew correction rollers 404 is arranged in the punch path to correct inclination of the sheet being in conveyance. When a leading edge of the sheet is detected by an alignment sensor 403, the relevant sheet is moved and stopped so that its punch position comes to be directly below a punch die 405 having a punching blade. Then, the punch die 405 moves downward to make a punch hole on the sheet. In the present embodiment, in order to make the punch holes for binding a product of the saddle-stitch bookbinding to the binder, the punching is performed at the two positions that are symmetrical with respect to the center line of the sheet being saddle-stitch positions.

Incidentally, punch wastes that are generated during the punching are collected in a punch waste collection box 406 arranged at the bottom of the multifunctional puncher and thus can be collected.

Subsequently, the structure and operation of the saddle-stitch bookbinding device 3004 will be described with reference to FIG. 5.

Figure 5:
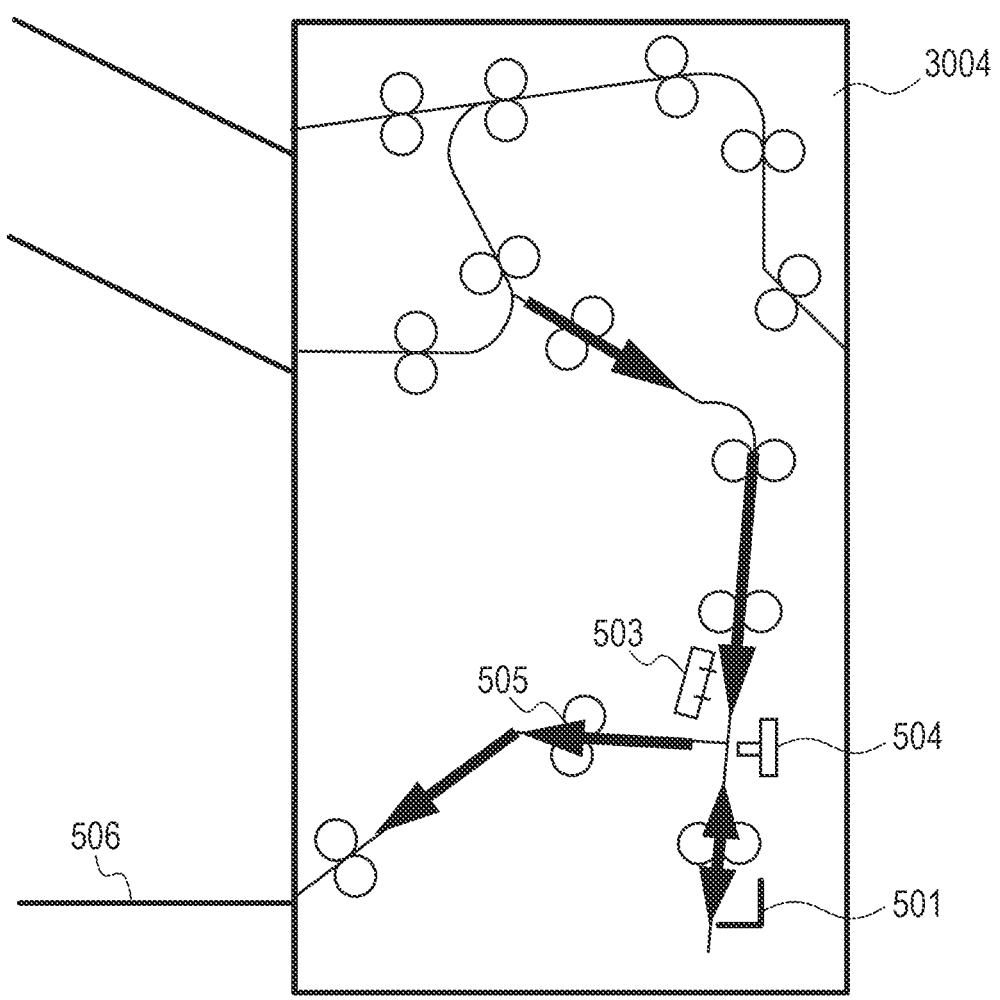
FIG. 5 is a cross-sectional diagram for describing an example of a constitution of a saddle-stitch bookbinding device.

FIG. 5 is the cross-sectional diagram for describing an example of a constitution of the saddle-stitch bookbinding device 3004.

Although the saddle-stitch bookbinding device 3004 has various functions, the saddle-stitch bookbinding process that is related to the present embodiment will be described here.

The sheet conveyed from the multifunctional puncher 3003 is loaded on a saddle-stitch process tray 501 along a path indicated by the arrows illustrated in FIG. 5. When all the sheets that are required for bookbinding have been loaded, the saddle-stitch process tray 501 moves to a position where a stapling unit 503 comes to the center of the sheet. Subsequently, the stapling unit 503 staples the sheets (i.e., a saddle-stitch process). Further, the saddle-stitch process tray 501 moves the sheets, and a paper guide plate 504 pushes the center position of the sheet toward sheet folding rollers 505. The sheets of which the center has been folded are discharged as a product that has been saddle-stitched on a saddle-stitch tray 506 by the sheet folding rollers 505. Incidentally, in the saddle-stitch bookbinding device 3004, it is possible to perform only the saddle-stitch process without performing the folding process, or it is possible to perform only the folding process without performing the saddle-stitch process.

Subsequently, a series of processes for performing prohibition of the punching process in a case where the information processing controller unit 101 according to the first embodiment performs the punching process of the digital multifunctional peripheral and the finishing process of the digital multifunction peripheral other than the punching process will be described with reference to FIG. 6.

Figure 6:
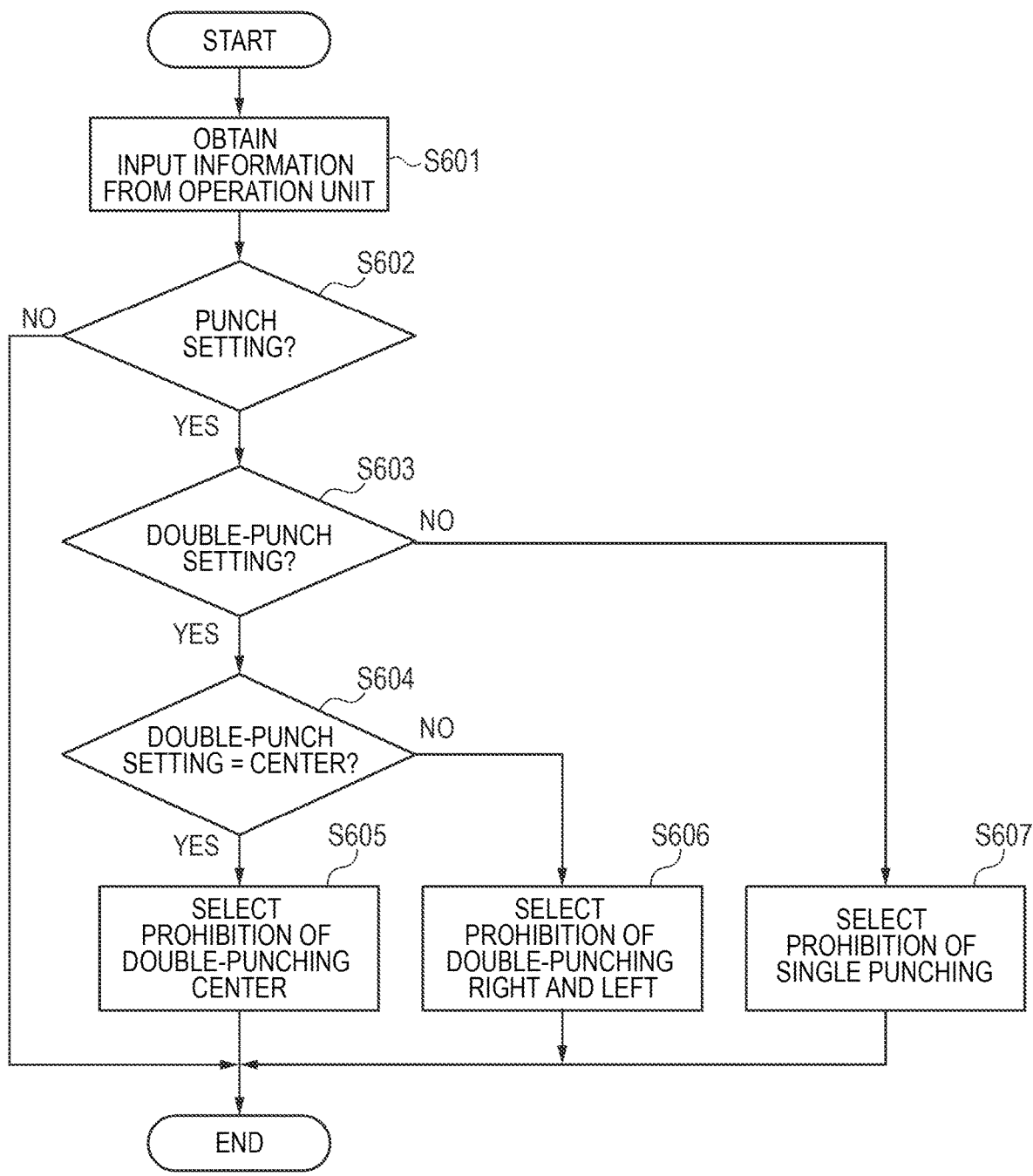
FIG. 6 is a flowchart for describing a process of performing prohibition of a punching process according to a first embodiment.

FIG. 6 is the flowchart for describing an example of the process of performing the prohibition of the punching process according to the first embodiment. It should be noted that this process is performed by the CPU 201 of the information processing controller unit 101 executing a control program read from the ROM 202 or the HDD 204 and expanded in the RAM 203.

In S601, the CPU 201 obtains input information by a user from the operation unit 106, and proceeds the process to S602.

In S602, the CPU 201 confirms whether or not there is a punch setting (whether or not the punch setting has been made). When there is no punch setting (NO in S602), the CPU 201 ends the process of this flowchart.

On the other hand, when there is the punch setting (YES in S602), the CPU 201 proceeds the process to S603.

In S603, the CPU 201 confirms whether or not there is a double-punch setting. Here, as exemplarily described later in FIGS. 7D-1 to 7D-3, double punching that is set in the double-punch setting corresponds to a punching process in which punch holes are made at two places on a sheet. Further, as exemplarily described later in FIGS. 7B and 7C, single punching corresponds to a punching process in which a punch hole is made only at one place on a sheet.

When there is no double-punch setting (NO in S603), the CPU 201 proceeds the process to S607.

In S607, the CPU 201 sets "prohibition of single punching". An example of the setting of "prohibition of single punching" will be described later with reference to FIG. 12, and, in this setting, a combination of "bookbinding" and "single punching" cannot be performed (impossible) (that is, this combination is prohibited).

On the other hand, when there is the double-punch setting (YES in S603), the CPU 201 proceeds the process to S604.

Figures 7A, 7B, 7C, 7D-1, 7D-2, 7D-3:
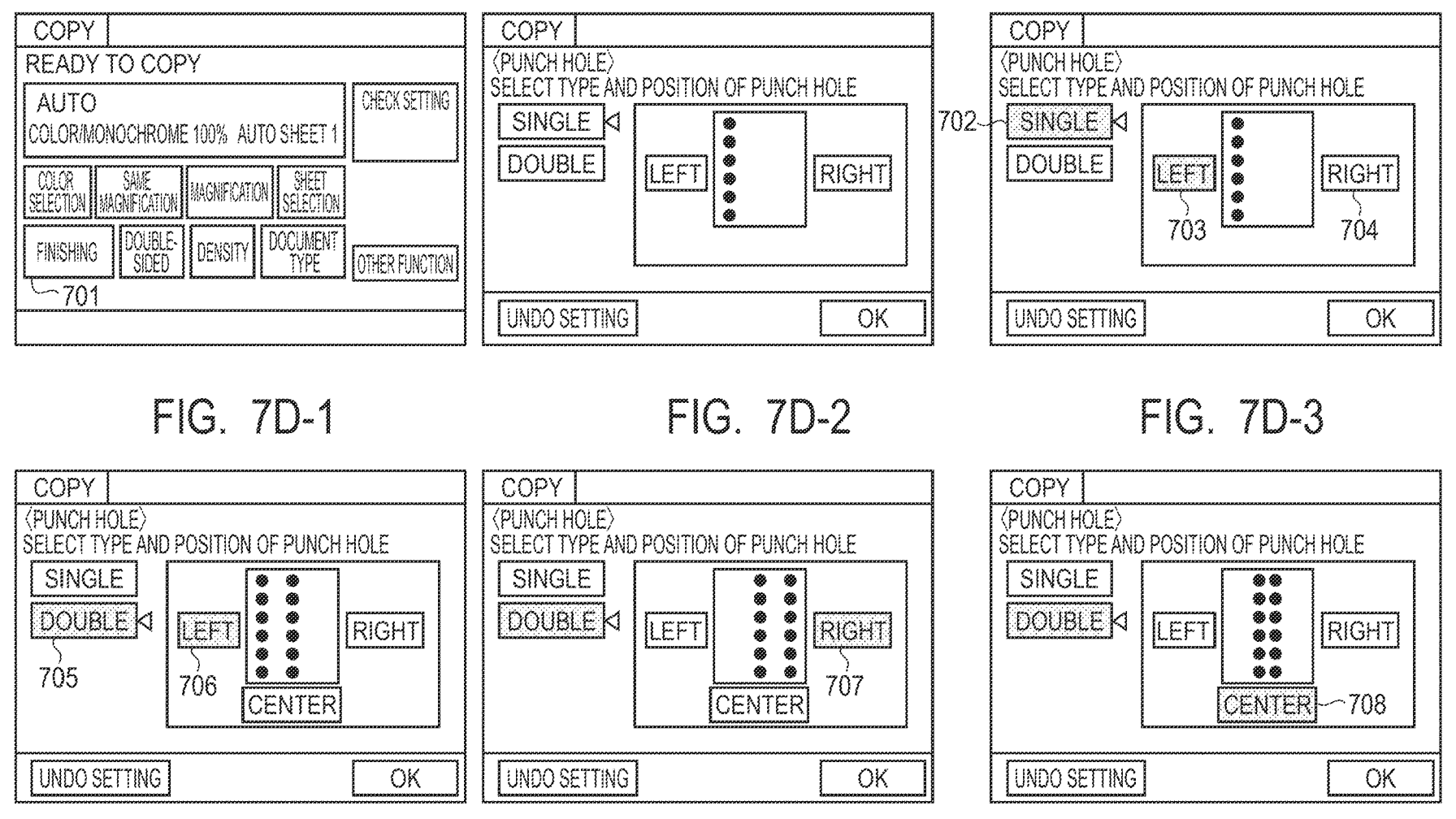

In S604, the CPU 201 confirms whether or not the double-punch setting is "center". Here, it should be noted that the double punching includes "left" in which the left edge and the center of a sheet are punched as shown in FIG. 7D-1, "right" in which the right edge and the center of a sheet are punched as shown in FIG. 7D-2, and "center" in which the two places in the center of a sheet are punched as shown in FIG. 7D-3.

When the double-punch setting is not "center" (NO in S604), the CPU 201 proceeds the process to S606.

In S606, the CPU 201 sets "prohibition of double-punching right and left". An example of the setting of "prohibition of double-punching right and left" will be described later with reference to FIG. 12, and, in this setting, a combination of "bookbinding" and "double-punching right and left" cannot be performed (impossible) (that is, this combination is prohibited).

On the other hand, when the double-punch setting is "center" (YES in S604), the CPU 201 proceeds the process to S605.

In S605, the CPU 201 sets "prohibition of double-punching center". An example of the setting of "prohibition of double-punching center" will be described later with reference to FIG. 12, and, in this setting, a combination of "bookbinding" and "double-punching center" can be performed (possible).

With the above, the series of processes described with reference to FIG. 6 is completed.

FIG. 12 is the diagram for explaining the relationship between the prohibition of the bookbinding process and the prohibition of the punching process according to the first embodiment.

As explained in FIG. 12, the combination of "bookbinding" and "single punching" is prohibited. In addition, the combination of "bookbinding" and "double-punching right and left" is prohibited. However, the combination of "bookbinding" and "double-punching center" can be performed.

Hereinafter, then example in which "prohibition of double-punching center" is set in S605 of FIG. 6 will be described with reference to FIGS. 7A to 7D-3 and FIGS. 8A to 8C.

FIGS. 7A to 7D-3 and FIGS. 8A to 8C are the diagrams for explaining "prohibition of double-punching center" according to the first embodiment.

FIG. 7A corresponds to a copy screen to be displayed on the operation unit 106 of the digital multifunction peripheral. A finishing button 701 is a button for setting the punching function, which is a finishing function to be set at a time of copying. When the finishing button 701 is pressed, the CPU 201 performs screen transition to a screen illustrated in FIG. 7B, and controls to be able to select the punching capable of being performed by the multifunctional puncher 3003. Here, the multifunctional puncher 3003 can perform the single punching and the double punching.

FIG. 7C corresponds to a screen to be displayed when the single punching is set.

A single-punching button 702 is a button for setting the single punching. When the single punching is set, the CPU 201 performs screen transition to a screen illustrated in in FIG. 7C, and controls to be able to select a left button 703 for setting to punch on the left side of a document (sheet) and a right button 704 for setting to punch on the right side of a document. The screen illustrated in FIG. 7C corresponds to a case where the punching on the left side of the document is set.

FIGS. 7D-1 to 7D-3 correspond to screens to be displayed when the double punching is set.

A double-punching button 705 is a button for setting the double punching. When the double punching is set, the CPU 201 performs screen transition to screens respectively illustrated in FIGS. 7D-1 to 7D-3, and controls to be able to select a left button 706 for setting to punch on the left side of a document (sheet) and a right button 707 for setting to punch on the right side of a document. The screen illustrated in FIG. 7D-1 corresponds to a case where "double-punching left" for punching at the left edge and the center of a sheet is set. The screen illustrated in FIG. 7D-2 corresponds to a case where "double-punching right" for punching at the right edge and the center of a sheet is set. The screen illustrated in FIG. 7D-3 corresponds to a case where "double-punching center" for punching at two places in the center of a sheet is set using a center button 708.

Figure 8A:
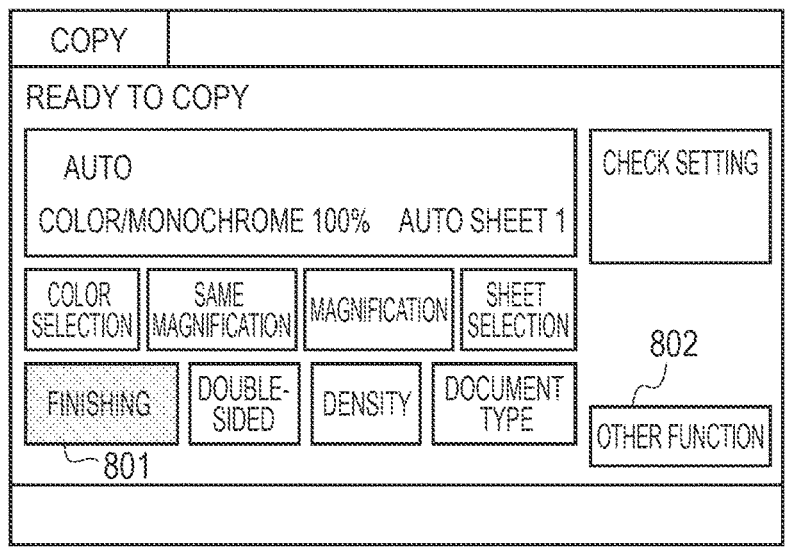
FIGS. 8A, 8B and 8C are diagrams for explaining "prohibition of double-punching center" according to the first embodiment.

When an "OK" button is pressed on the screen illustrated in each of FIGS. 7C and 7D-1 to 7D-3, the CPU 201 performs the corresponding punch setting and performs screen transition to a screen as illustrated in FIG. 8A.

FIG. 8A corresponds to a screen to be displayed when the punch setting is made on the screen illustrated in FIG. 7A. In FIG. 8A, the display mode of a finishing button 801 (corresponding to 701 in FIG. 7A) is changed (for example, the color thereof is changed), so that it is possible to see that the punch setting has been made.

Figure 8B:
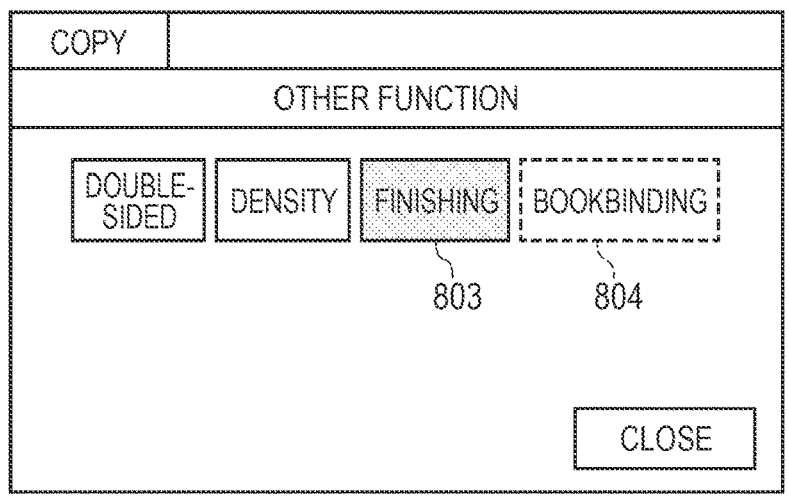
Figure 8C:
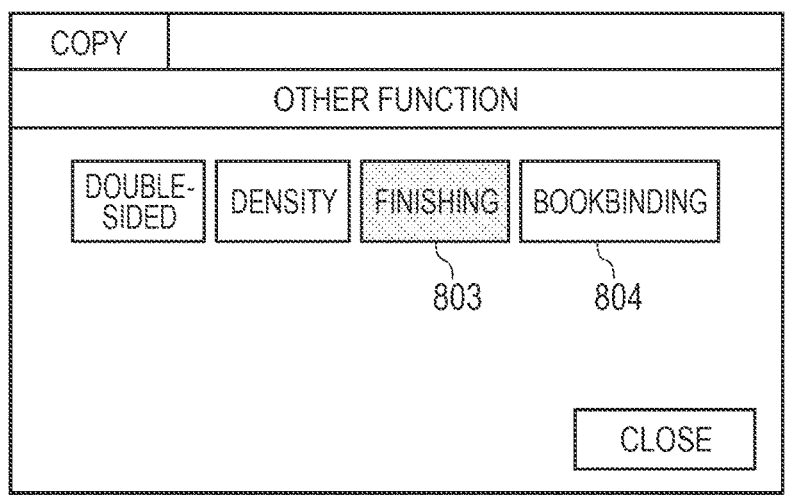

In FIG. 8A, when an other function button 802 is pressed, the CPU 201 performs screen transition to a screen as illustrated in FIG. 8B or FIG. 8C, and controls whether or not the bookbinding function can be set.

The screen illustrated in FIG. 8B corresponds to a screen to be displayed when, as a finishing setting, the punching function (i.e., "single punching", "double-punching left" or "double-punching right") other than "double-punching center" is set as illustrated in FIG. 7C, FIG. 7D-1 or FIG. 7D-2. Same as above, on this screen, the display mode of a finishing button 803 is changed, so that it is possible to see that the punch setting has been made. Besides, on this screen, a bookbinding button 804 cannot be selected (prohibition of selection) under the control of the CPU 201. This control is based on the prohibition set in S606 and S607 of FIG. 6 respectively.

The screen illustrated in FIG. 8C corresponds to a screen to be displayed when "double-punching center" is set as the finishing setting as illustrated in FIG. 7D-3. On this screen, the bookbinding button 804 can be selected under the control of the CPU 201. This control is based on the prohibition process set in S605 of FIG. 6.

Subsequently, a series of processes for performing prohibition of the bookbinding process in a case where the information processing controller unit 101 according to the first embodiment performs the bookbinding process of the digital multifunction peripheral and the finishing process of the digital multifunction peripheral other than the bookbinding process will be described with reference to FIG. 9.

Figure 9:
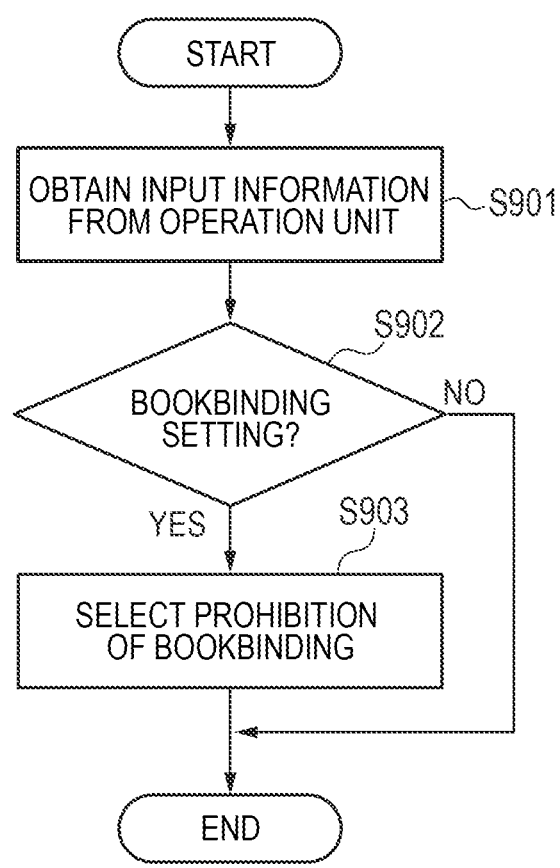
FIG. 9 is a flowchart for describing a process of performing prohibition of a bookbinding process according to the first embodiment.

FIG. 9 is the flowchart for describing an example of the process of performing the prohibition of the bookbinding process according to the first embodiment. It should be noted that this process is performed by the CPU 201 of the information processing controller unit 101 executing a control program read from the ROM 202 or the HDD 204 and expanded in the RAM 203.

In S901, the CPU 201 obtains input information by a user from the operation unit 106, and proceeds the process to S902.

In S902, the CPU 201 confirms whether or not there is a bookbinding setting (that is, whether or not the bookbinding setting has been made). When there is no bookbinding setting (NO in S902), the CPU 201 ends the process of this flowchart.

On the other hand, when there is the bookbinding setting, the CPU 201 proceeds the process to S903.

In S903, the CPU 201 sets the prohibition of the bookbinding process. An example of the prohibition of the bookbinding process will be described with reference to FIG. 12, and, in this case, a combination of the setting of the bookbinding process and the setting of "double-punching center" can be performed.

With the above, the series of processes described with reference to FIG. 9 is completed.

Hereinafter, an example of the case where the prohibition of the bookbinding process is set in S903 of FIG. 9 will be described with reference to FIGS. 10A to 10C and FIGS. 11A and 11B.

FIGS. 10A to 10C and FIGS. 11A and 11B are the diagrams for describing the prohibition of the bookbinding process according to the first embodiment.

Figure 10A:
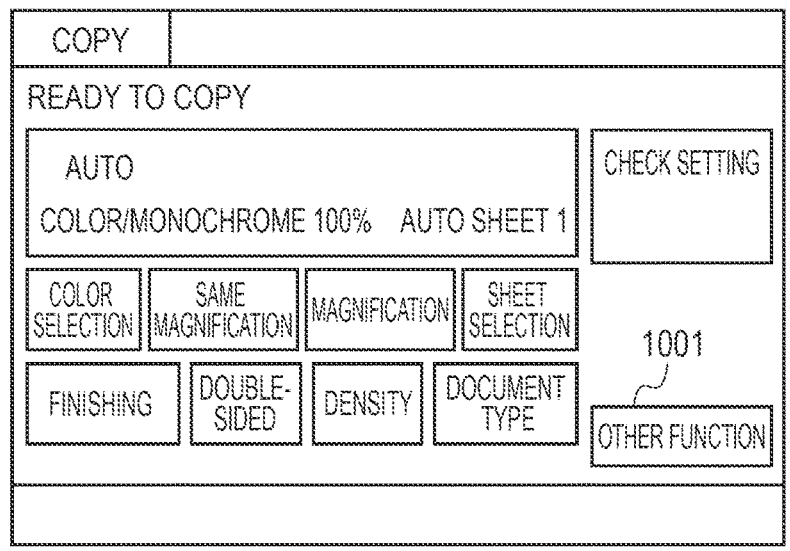
FIGS. 10A, 10B and 10C are diagrams for explaining the prohibition of the bookbinding process according to the first embodiment.

The screen illustrated in FIG. 10A corresponds to a copy screen to be displayed on the operation unit 106 of the digital multifunction peripheral.

In FIG. 10A, an other function button 1001 is a button for performing various settings which are application functions to be set at a time of copying. When the other function button 1001 is pressed, the CPU 201 performs screen transition to a screen illustrated in FIG. 10B.

Figure 10B:
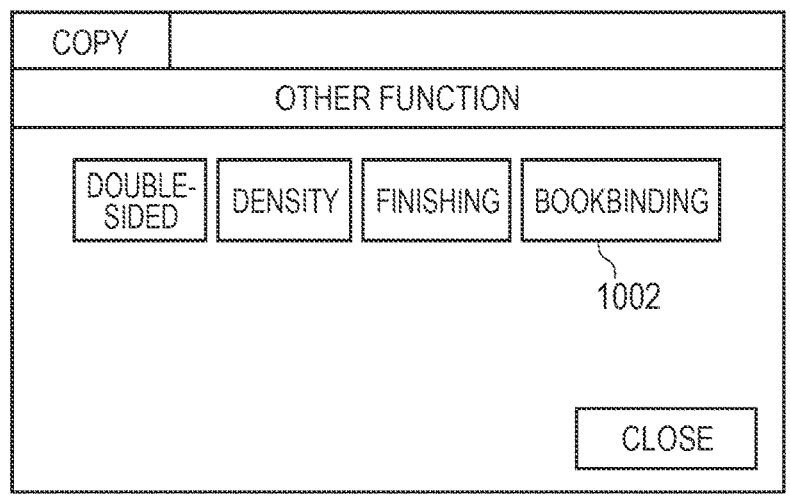

The screen illustrated in FIG. 10B corresponds to an other function setting screen.

In FIG. 10B, a bookbinding button 1002 is a button for making the bookbinding setting. When the bookbinding button 1002 is pressed, the CPU 201 performs screen transition to a screen illustrated in FIG. 10C.

Figure 10C:
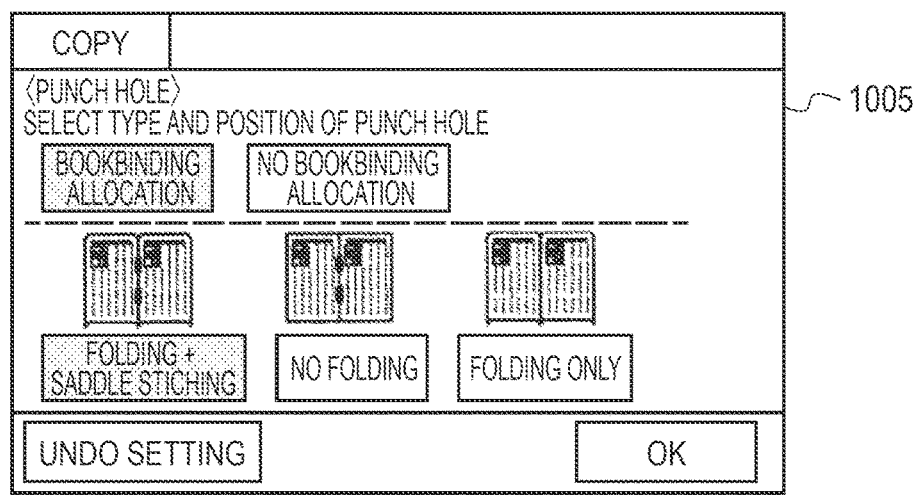

The screen illustrated in FIG. 10C corresponds to a bookbinding setting screen.

On the bookbinding setting screen of FIG. 10C, it is possible to make the bookbinding setting by making arbitrary settings within a screen 1005. For example, it is possible to make the bookbinding settings of "folding+saddle stitching", "no folding" and "folding only". Here, the bookbinding setting of "folding+saddle stitching" corresponds to the setting of performing the folding process of folding the sheet along its center line and the saddle-stitch process of saddle-stitching the sheet on its center line. Besides, the bookbinding setting of "no folding" corresponds to the setting of performing the saddle-stitch process without performing the folding process. Besides, the bookbinding setting of "folding only" corresponds to the setting of performing the folding process and not performing the saddle-stitch process. Incidentally, an example described in FIG. 10C corresponds to the case where the bookbinding setting of "folding+saddle stitching" is set.

Figure 11A:
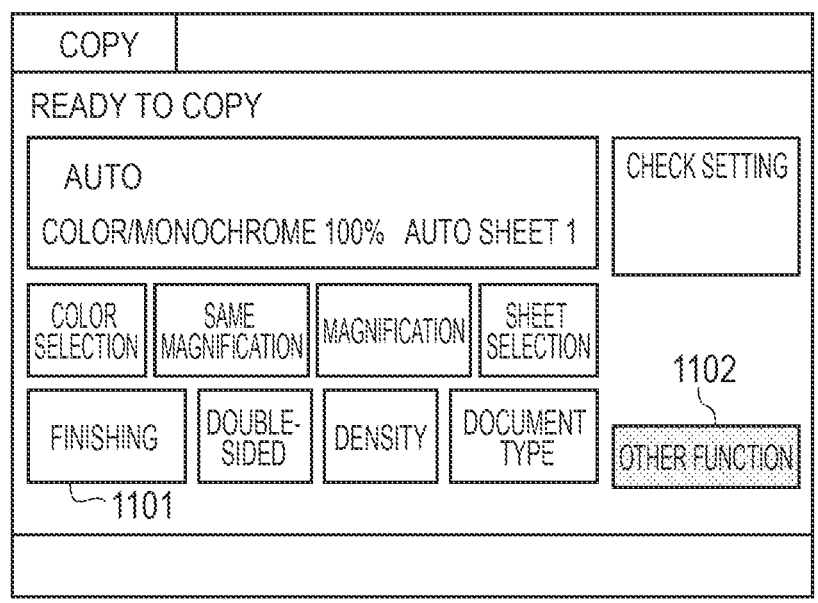
FIGS. 11A and 11B are diagrams for explaining the prohibition of the bookbinding process according to the first embodiment.

When an "OK" button is pressed in FIG. 10C, the CPU 201 performs the corresponding bookbinding setting and performs screen transition to a screen illustrated in FIG. 11A.

The screen illustrated in FIG. 11A corresponds to a screen to be displayed when the bookbinding setting is made in FIG. 10A. In FIG. 11A, the display mode of an other function button 1102 (corresponding to 1001 in FIG. 10A) is changed, so that it is possible to see that the other function is set (the bookbinding function is set in this example).

Figure 11B:
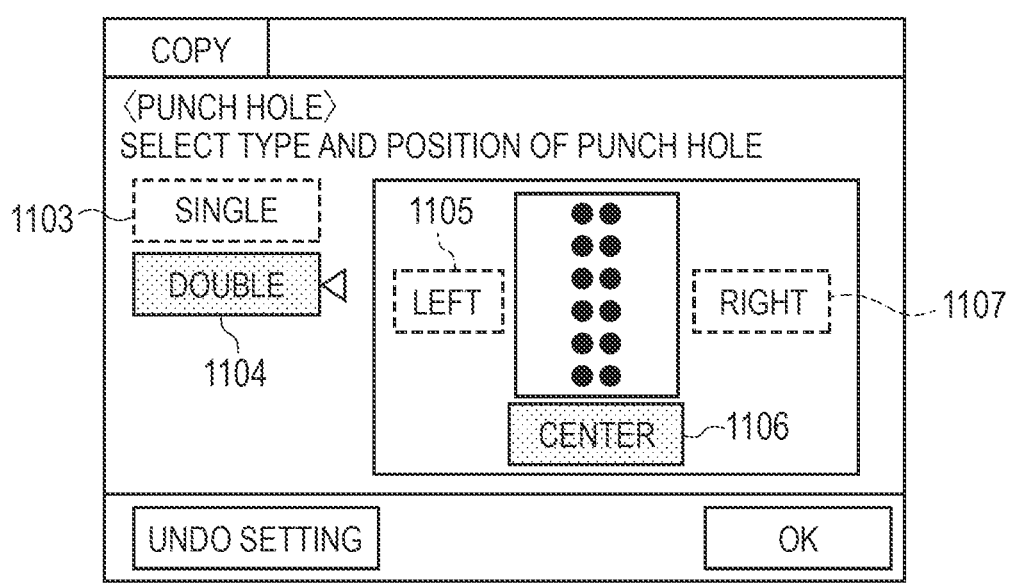

In FIG. 11A, when a finishing button 1101 is pressed, the CPU 201 performs screen transition to a screen illustrated in FIG. 11B, and controls whether or not to be able to set various punching functions.

The screen illustrated in FIG. 11B corresponds to a screen to be displayed when the bookbinding function is set (i.e., "folding+saddle stitching", "no folding" or "folding only" as illustrated in FIG. 10C). On this screen, a single button 1103 for setting the single punching cannot be selected (selection is prohibited) and a double button 1104 for setting the double punching can be selected, under the control of the CPU 201. Furthermore, a left button 1105 for setting "double-punching left" and a right button 1107 for setting "double-punching right" cannot be selected (selection is prohibited), and a center button 1106 for setting "double-punching center" can be selected. This control is based on the prohibition of the bookbinding process set in S903 of FIG. 9.

The above is the details of the series of processes for performing the prohibition at the time when the finishing process and punching process of the digital multifunction peripheral are simultaneously performed in the information processing apparatus according to the first embodiment.

Incidentally, it should be assumed that the above saddle-stitch bookbinding ("folding+saddle stitching", "no folding" or "folding only") includes division bookbinding of dividing, when the number of documents is large, these documents and then performing the saddle-stitch bookbinding.

As described above, it is permitted to set in combination the "double-punching center" of performing the punching process at the two places symmetrically with respect to the center line of the sheet and the bookbinding setting of performing the bookbinding process. Further, it is prohibited to set in combination the punch setting, different from the "double-punching center", and the bookbinding setting. As a result, when the punching process and the bookbinding process are performed in combination in the image forming apparatus, it is possible to prevent unnecessary (ineffectual) punching process and bookbinding processing from being performed. For this reason, in the punching process and the bookbinding process that are performed in the image forming apparatus, it is possible to effectually perform both the processes.

Incidentally, in the multifunction peripheral 1000, it is possible to perform printing on a punched paper (sheet). The CPU 201 permits to combine the setting of "printing on punched paper" and the setting of "double-punching center", but performs prohibition control such that the setting of "printing on punched paper" and the setting of the punching process other than "double-punching center" become impossible (prohibited). Incidentally, when the setting of "printing on punched paper" and the setting of "double-punching center" are made, for example, the CPU 201 performs control such that the punch hole is made only on one place at the center of the punched paper by the multifunctional puncher 3003. That is, there is provided a state of the double punching in which the punch hole previously made and the punch hole newly made constitute the punch holes made on the two places of the paper.

Besides, the production printing system 3000 can be equipped with a Z-folding machine (not shown) that realizes a Z-folding function of folding a sheet into a Z-shape (Z-folding process) as an in-line type sheet processing device. In a case where the production printing system 3000 is equipped with the Z-folding machine, the CPU 201 performs such prohibition control as follows. That is, the CPU 201 performs the prohibition control, such that a combination of a Z-fold setting of performing the Z-folding process and the setting of "single punching" above becomes possible but the Z-fold setting and the setting of the punching process other than "single punching" become impossible (prohibited).

As described above, according to the first embodiment, when the punching process and the finishing process other than the punching process are simultaneously performed by the image forming apparatus, it is possible to prevent an unnecessary (ineffectual) finishing process from being performed. Therefore, in the punching process and the finishing process other than the punching process that are performed in the image forming apparatus, it is possible to effectually perform both the processes.

Second Embodiment

In the first embodiment, the case where the finishing setting in the copying process is made from the operation unit 106 of the multifunction peripheral 1000 has been described. In the second embodiment, a case where a print job that is generated by a printer driver of a PC capable of communicating with the multifunction peripheral 1000 via the network 230 or the like is performed by the multifunction peripheral 1000 will be described. In this case, the setting of the finishing process is made on a print setting screen of the printer driver to be executed on the PC.

Here, the PC is an information processing device such as a general personal computer that is equipped with a CPU, a ROM, a RAM, an auxiliary storage device such as an HDD or an SSD, a network I/F and the like. By the CPU of the PC like this reading a printer driver program or the like stored in the HDD or the like into the RAM and executing it, it is possible to realize a function of the printer driver of generating the print job and transmits the generated print job to the multifunction peripheral 1000.

The printer driver accepts various print settings (including the settings of the punching function and bookbinding function) from the print setting screen. Besides, on this print setting screen, in the case where the settings of the punching process and bookbinding process (for example, "folding+saddle stitching", "no folding" or "folding only") are accepted, the printer driver performs the process same as that described with reference to FIG. 9 and FIGS. 11A and 11B and realizes the control same as that described in the first embodiment.

That is, the CPU of the PC performs, as the print setting of the print job, the control of permitting to make in combination the setting of "double-punching center" and the bookbinding setting, and of prohibiting to make in combination the punch setting other than the setting of "double-punching center", and the bookbinding setting.

For example, the bookbinding setting is permitted in the case where the setting of "double-punching center" is made, whereas the bookbinding setting is prohibited in the case where the punch setting other than the setting of "double-punching center" is made. Besides, in the case where the bookbinding setting is made, the setting of "double-punching center" is permitted and the punch setting other than the setting of "double-punching center" is prohibited.

Besides, as well as the first embodiment, it should be assumed that the above saddle-stitch bookbinding ("folding+saddle stitching", "no folding" or "folding only") includes division bookbinding of dividing, when the number of documents is large, these documents and then performing the saddle-stitch bookbinding.

Also, it should be noted that the operation to be performed when performing printing on a punched paper is the same as that described in the first embodiment. That is, the CPU of the PC permits to combine the setting of "printing on punched paper" and the setting of "double-punching center", but performs prohibition control such that the setting of "printing on punched paper" and the setting of the punching process other than "double-punching center" become impossible (prohibited). Then, when the setting of "printing on punched paper" and the setting of "double-punching center" are made in the print job, the punch hole is made only on one place at the center of the punched paper by the multifunctional puncher 3003.

Also, it should be noted that the operation to be performed when performing Z-folding is the same as that described in the first embodiment. That is, the CPU of the PC performs the prohibition control, such that a combination of a Z-fold setting and the setting of "single punching" becomes possible but the Z-fold setting and the setting of the punching process other than "single punching" become impossible (prohibited).

In the above explanation, the constitution for generating the print job by the printer driver has been described, but the constitution may be such that the print job is generated by another application or an OS.

As described above, according to the second embodiment, when the punching process and the finishing process other than the punching process are simultaneously performed by the image forming apparatus based on the print job generated by the PC, it is possible to prevent an unnecessary (ineffectual) finishing process from being performed. For this reason, in the punching process and the finishing process other than the punching process that are performed in the image forming apparatus based on the print job generated by the PC, it is possible to effectually perform both the processes.

Therefore, according to each of the above embodiments, in the case where the punching process and the finishing process other than the punching process are simultaneously performed by the image forming apparatus, it is possible to prevent the unnecessary (ineffectual) finishing process from being performed. For this reason, in the punching process and the finishing process other than the punching process that are performed by the image forming apparatus, it is possible to effectually perform both the processes.

It should be noted that the structure and contents of the various data described above are not limited to them, and it goes without saying that the structure and contents are various depending on usage and purpose.

Although one embodiment has been described as above, the present invention can take an embodiment as a system, an apparatus, a method, a program, a storage medium or the like, for example. More specifically, the present invention may be applied to a system that is composed of a plurality of devices, or may be applied to an apparatus that is composed of one device.

In addition, all constitutions that are obtained by combining the above embodiments are also included in the present invention.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-023140, filed Feb. 14, 2020, which is hereby incorporated by reference herein in its entirety.

What is claimed is:

1. An image forming apparatus that is equipped with a punching function of performing a punching process to punch a sheet and a bookbinding function of performing a bookbinding process to sheets, the image forming apparatus comprising:
   a control unit configured to perform control of permitting to set in combination a first punch setting of performing the punching process symmetrically with respect to a center line of the sheet and a bookbinding setting of performing the bookbinding process, and of prohibiting to set in combination a punch setting, different from the first punch setting, and the bookbinding setting.

2. The image forming apparatus according to claim 1, wherein the control unit is configured to perform control of permitting the bookbinding setting in a case where the first punch setting has been made, and of prohibiting the bookbinding setting in a case where the punch setting different from the first punch setting has been made.

3. The image forming apparatus according to claim 1, wherein the control unit is configured to perform control of permitting the first punch setting and of prohibiting the punch setting different from the first punch setting, in a case where the bookbinding setting has been made.

4. The image forming apparatus according to claim 1, wherein the bookbinding setting is a setting of performing at least either a folding process of folding a sheet along its center line or a saddle-stitch process of saddle-stitching sheets on their center line.

5. The image forming apparatus according to claim 1, wherein the control unit is configured to perform control of permitting to set in combination the first punch setting and a setting of performing printing to a punched sheet, and of prohibiting to set in combination the punch setting different from the first punch setting and the setting of performing the printing to the punched sheet.

6. The image forming apparatus according to claim 5, wherein, in a case where the first punch setting and the setting of performing the printing to the punched sheet have been set in combination, the punching process is performed on one place at the center of the sheet.

7. The image forming apparatus according to claim 1, wherein
   the image forming apparatus is equipped with a Z-folding function of performing a Z-folding process of folding a sheet into a Z shape, and
   the control unit is configured to perform control of permitting to set in combination a second punch setting of performing a punching process at one place of a sheet by using the punching function and a Z-folding setting of performing the Z-folding process, and of prohibiting to set in combination a punch setting, different from the second punch setting, and the Z-folding setting.

8. A controlling method for an image forming apparatus equipped with a punching function of performing a punching process to punch a sheet and a bookbinding function of performing a bookbinding process to sheets, the controlling method comprising:
   permitting to set in combination a first punch setting of performing the punching process symmetrically with respect to a center line of the sheet and a bookbinding setting of performing the bookbinding process; and
   prohibiting to set in combination a punch setting, different from the first punch setting, and the bookbinding setting.

9. A non-transitory computer-readable storage medium of storing a program for causing a computer to function as the control unit described in claim 1.

10. An apparatus that transmits a post-process instruction to a post-processing unit having a double-punching function of performing a punching process to make two rows of punch holes on a sheet and a bookbinding function of performing a bookbinding process to sheets, the apparatus comprising:
    a determining unit configured to determine whether or not to perform exclusive control between the double-punching function and the bookbinding function in accordance with an arrangement of the two rows of the punch holes in the double-punching function.

11. A non-transitory computer-readable storage medium of storing a program for causing a computer to function as the apparatus described in claim 10.

* * * * *